Patented June 23, 1925.

1,542,928

UNITED STATES PATENT OFFICE.

ALBERT WOLFF, OF BERLIN, GERMANY.

PROCESS FOR THE PRODUCTION OF DISINFECTING SOLUTIONS WHICH ARE CAPABLE OF BEING REGENERATED.

No Drawing. Application filed July 7, 1924. Serial No. 724,714.

*To all whom it may concern:*

Be it known that I, ALBERT WOLFF, a citizen of the Prussian State, and residing at 13/14 Hedemannstrasse, Berlin S. W., Germany, have invented a certain new and useful Process for the Production of Disinfecting Solutions Which are Capable of Being Regenerated, of which the following is a specification.

It has already been proposed by saturating water and neutral and more particularly acid salt solutions with ozone to produce aqueous ozone solutions, which may contain, when neutral chlorides are used, up to 8.9 mg. ozone to the liter, according to the temperature and concentration of the solution. Such solutions, however, are not stable and their titer, as tests have proved, decreases from hour to hour, and goes back to zero in the course of 24 hours, the disinfecting power being lost.

It has been found that considerably more stable disinfecting solutions are obtained, if neutral or only slightly alkaline but not acid solutions of the chlorides of such metals as are capable of forming hypochlorites be treated in the course of several days repeatedly with ozone. The value of the thiosulphate titer of the solution increases constantly during such treatment. For example, an 8 per cent neutral magnesium chloride solution after being once saturated with ozone showed a titer of 30 c. cm. N/100 thiosulphate, on being resaturated after 2 days 260.8 c. cm., after 8 days 498 c. cm. and after a further 6 days 692 c. cm. The surprising fact was revealed that this solution showed no ozone or hydrogen peroxide reaction, but contains hypochlorite, as far as has been ascertained hitherto. Hence the process is suitable for the regeneration of hypochlorite solutions, which owing to disintegration have entirely or almost entirely lost their content of hypochlorite having a disinfecting action and have substantially become converted into chloride solutions.

The formation of hypochlorite from chloride solutions by means of ozone is assisted by the presence of even quite small quantities of metallic oxides, which possibly have a catalytic action, such as oxide of iron, oxide of copper, oxide of nickel and the like. Hence from solutions of perfectly pure metallic chlorides solutions have been obtained having a considerably lower thiosulphate titer and consequently a lower disinfecting power than from chloride solutions mixed with oxide of iron or containing oxide of iron as an impurity.

1 to 10% solutions of magnesium, calcium and sodium chloride have been found most suitable for the present purpose. When concentrated solutions were used, the effect obtained was not so good.

*Examples.*

(1) 3000 c. cm. of an 8% magnesium chloride solution containing traces of oxide of iron are exposed in an absorption tower in a finely divided state for 1 hour to the action of ozone, after which the solution will be saturated. In the course of several days this solution is treated with ozone four times, 1 hour at a time, i. e. till it is resaturated. Its titer will then be about 700 c. cm. N/100 thiosulphate to the liter, but can be still further increased by further treatment with ozone at suitable intervals.

(2) A hypochlorite solution, which has so far lost its hypochlorite content as to have become ineffective, may be diluted until it contains no more than 10% chloride, is mixed with a very small quantity of oxide of iron and is thereupon treated with ozone to the point of saturation, until it has a sufficiently high titer.

What I claim is:—

1. A process for producing hypochlorite solutions, consisting in treating neutral or only slightly alkaline dilute aqueous solutions of chlorides of metals capable of forming hypochlorites with ozone until they are saturated with the latter, the said treatment being repeated several times and spread over a considerable period, as set forth.

2. A process for producing hypochlorite solutions, consisting in treating neutral or only slightly alkaline dilute aqueous solutions of chlorides of metals capable of forming hypochlorites with ozone in the presence of a metallic oxide until they are saturated with ozone, the said treatment being repeated several times and spread over a considerable period, as set forth.

In testimony whereof I have signed my name to this specification.

ALBERT WOLFF.